United States Patent [19]

McLaughlin et al.

[11] Patent Number: 5,988,847
[45] Date of Patent: Nov. 23, 1999

[54] SYSTEMS AND METHODS FOR IMPLEMENTING A DYNAMIC CACHE IN A SUPERVISORY CONTROL SYSTEM

[75] Inventors: Paul F. McLaughlin, Hatfield, Pa.; Ian K. Canavan, Sydney; Peter C. Davis, Killara, both of Australia

[73] Assignee: Honeywell Inc., Minneapolis, Minn.

[21] Appl. No.: 08/916,870

[22] Filed: Aug. 22, 1997

[51] Int. Cl.[6] .................................................. G05B 15/02
[52] U.S. Cl. .......................... 364/138; 364/131; 364/139; 395/200.31; 395/200.43; 707/10; 711/18
[58] Field of Search ..................................... 364/138, 139, 364/131–134; 707/10; 702/188; 711/118; 395/200.31–200.33, 200.38–200.41, 200.43, 200.47–200.49

[56] References Cited

U.S. PATENT DOCUMENTS

| | | | |
|---|---|---|---|
| 4,855,906 | 8/1989 | Burke | 707/10 |
| 4,972,367 | 11/1990 | Burke | 364/138 X |
| 5,311,451 | 5/1994 | Barrett | 364/550 |
| 5,355,453 | 10/1994 | Row et al. | 395/200 |
| 5,463,735 | 10/1995 | Pascucci et al. | 395/200.1 |
| 5,530,857 | 6/1996 | Gimza | 707/10 |
| 5,598,566 | 1/1997 | Pascucci | 395/570 |
| 5,642,506 | 6/1997 | Lee | 395/200.38 |

*Primary Examiner*—William Grant
*Assistant Examiner*—Peter W. Eissmann
*Attorney, Agent, or Firm*—William A. Munck; John T. Mockler

[57] ABSTRACT

The present invention provides systems and methods for controlling processes of a process facility and, in particular, for distributing data among nodes of a real time process control system controlling such a facility. An exemplary process control system includes a plurality of sensors, controllable devices, and communication paths, and a computer system. The sensors and controllable devices are associated with various ones of the processes of the process facility, and the communication paths couple the sensors and controllable devices to the computer system. The computer system operates on data related to the process facility, and distributes the data among both client and process nodes. The client nodes desire data associated with processes of the facility and the process nodes control such process data. The computer system includes (i) a cache having a short access time for retrieving records, and (ii) a supervisory controller, associated with the client and process nodes, that controls storage of the process data in the cache and selectively transfers the process data from the cache to the client nodes.

28 Claims, 6 Drawing Sheets

SYSTEMS AND METHODS FOR IMPLEMENTING A DYNAMIC CACHE IN A SUPERVISORY CONTROL SYSTEM

CROSS-REFERENCE TO RELATED APPLICATIONS

The present invention is related to that disclosed in (1) U.S. patent application Ser. No. 08/920,265, entitled "Systems and Methods for Accessing Data Using Cyclic Publish/Subscribe Scheme with Report By Exception," which was filed on Aug. 22, 1997; and (2) U.S. patent application Ser. No. 08/916,871, entitled "Systems and Methods for Generating and Distributing Alarm And Event Notifications," which was filed on Aug. 22, 1997, which applications are commonly assigned to the Assignee of the present invention and filed concurrently herewith. The disclosures of these related patent applications are incorporated herein by reference for all purposes as if fully set forth herein.

TECHNICAL FIELD OF THE INVENTION

The present invention is directed, in general, to process control systems and, more specifically, to a process control system, and method of operating the same, using a dynamic cache database in a supervisory control system.

BACKGROUND OF THE INVENTION

Many process facilities (e.g., a manufacturing plant, a mineral or crude oil refinery, etc.) are managed using distributed control systems. Typical contemporary control systems include numerous modules tailored to monitor and/or control various processes of the facility. Conventional means link these modules together to produce the distributed nature of the control system. This affords increased performance and a capability to expand or reduce the control system to satisfy changing facility needs.

Process facility management providers, such as Honeywell, Inc., develop control systems that can be tailored to satisfy wide ranges of process requirements (e.g., global, local or otherwise) and facility types (e.g., manufacturing, warehousing, refining, etc.). Such providers have two principle objectives. The first objective is to centralize control of as many processes as possible to improve an overall efficiency of the facility. The second objective is to support a common interface that communicates data among various modules controlling or monitoring the processes, and also with any such centralized controller or operator center.

Each process, or group of associated processes, has one or more input characteristics (e.g., flow, feed, power, etc.) and one or more output characteristics (e.g., temperature, pressure, etc.) associated with it. Model predictive control ("MPC") techniques have been used to optimize certain processes as a function of such characteristics. One MPC technique uses algorithmic representations of certain processes to estimate characteristic values (represented as parameters, variables, etc.) associated with them that can be used to better control such processes. In recent years, physical, economic and other factors have been incorporated into control systems for these associated processes.

Examples of such techniques are described in U.S. Pat. No. 5,351,184, entitled "Method of Multivariable Predictive Control Utilizing Range Control;" U.S. Pat. No. 5,561,599, entitled "Method of Incorporating Independent Feedforward Control in a Multivariable Predictive Controller;" U.S. Pat. No. 5,572,420, entitled "Method of Optimal Controller Design of Multivariable Predictive Control Utilizing Range Control;" and U.S. Pat. No. 5,574,638, entitled "Method of Optimal Scaling of Variables in a Multivariable Predictive Controller Utilizing Range Control," all of which are commonly owned along by the assignee of the present invention and incorporated herein by reference for all purposes (the foregoing issued patents and U.S. patent application Ser. No. 08/490,499, previously incorporated herein by reference, are collectively referred to hereafter as the "Honeywell Patents and Application").

The distributed control systems used to monitor and control a process are frequently linked by common communication pathways, such as by a local area network (LAN) architecture or by a wide area network (WAN) architecture. When a requesting node needs a datum from a responding node, it issues a request for the datum across the network and the responding node then returns the datum back across the network. Many process control systems use a supervisory control LAN or WAN integrated with one or more process control networks. The process control networks contain the basic raw data required by the supervisory control network and other process control networks.

Typically, a supervisory controller is linked to a flexible array of processor controllers using communication drivers matched to the specific processor controller being interfaced. The supervisory controller maps the essential data of these process controllers into a homogeneous database controlled by the supervisory controller for consistent storage and access by individual process controller or by any client application being executed by the supervisory controller.

Generally, a supervisory control network joins process control network(s) by polling (scanning) at a fixed or flexible interval for all data that is mapped by user configuration to the supervisory control systems database. One or more server nodes physically join the supervisory control local and wide area networks to the process control network (s). These server nodes are the data repositories for all client access among the supervisory client nodes. A problem is encountered, however, when the quantity of information in the process control network(s) is greater than that which can be polled all together at an acceptable update rate. In such a case it may take two or more pollings of a process control network to retrieve all of the data required by a client application. This is particularly true for those client applications where users may switch back and forth between screens (views) displaying data from a process control network.

There is therefore a need in the art for improved supervisory control systems that provide one or more client applications with faster access to information in a one or more process control systems. In particular, there is a need in the art for improved supervisory control systems that provide one or more client applications with faster data access than can be achieved by the periodic polling of the data.

SUMMARY OF THE INVENTION

To address the above-discussed deficiencies of the prior art, it is a primary object of the present invention to provide a data distribution, or delivery, scheme that is robust, reliable, deterministic and flexible. As introduced hereinabove, a typical process facility includes many associated processes, various ones of which are associated with different stages of the overall process (e.g., natural resource refining, filtration, gas/oil separation, fabrication and other like processes). The present invention introduces systems and methods that optimize distribution of information and improve cooperation between various process facility controls, whether peer-to-peer, client and server, or otherwise.

In the attainment of this primary object, the present invention provides systems and methods for controlling associated processes within process facilities and, in particular, for efficiently distributing data among nodes of a real time process control system that controls the facility. An exemplary process control system includes sensors, controllable devices, communication paths, and a computer system. The sensors and controllable devices are associated with various ones of the processes of the facility, and the communication paths associate the sensors and controllable devices with the computer system. The computer system operates on data relating to the process facility, and distributes the data among the nodes thereof.

According to an advantageous embodiment, the nodes include both client and process nodes, wherein the client nodes desire data associated with facility processes and the process nodes, which control the processes, and therefore control the process data. The computer system, in addition to the associated nodes, includes a cache and a supervisory controller. The cache is a relatively fast memory device that is capable of storing a plurality of records. The supervisory controller, which is associated with the client and process nodes, and which may be distributed or centralized, operates to (i) control storage of a portion of the process data in the records of the cache, and (ii) selectively communicate ones of such records from the cache to the client nodes. The client nodes execute client applications and preferably interact in a common way with the supervisory controller. The data stored in the records of the cache may have been recently accessed by the client nodes, be critical data or otherwise.

Because the quantity of information generated by the processes is typically much greater than that which may efficiently be polled en toto therefrom, or at an acceptable refresh rate, the cache provides a data repository having a relatively short time, as compared to polling one or more processes, to retrieve records therefrom.

According to a related embodiment, the supervisory controller selectively communicates the records in response to requests from the client nodes. More particularly, the client nodes request particular subsets of the process data and the supervisory controller makes a determination as to whether the requested subsets are stored in the cache. If the subsets are stored therein, the supervisory controller communicates the same to the client nodes, otherwise, it requests copies thereof from the process nodes.

In an alternate embodiment, the supervisory controller requests copies of the subsets from the process nodes, at least substantially in parallel with determining whether the subsets are stored in the cache. This embodiment significantly eliminates "latencies" inherent in the above-described embodiment—the time delays inviolable when some portion of the requested data subset is searched for in the cache first, and then, upon a determination that the same is not stored therein, a current instance of the same is requested from the process nodes. According to this embodiment, the supervisory controller makes the requests to the cache and the relevant processes in at least near parallel to avoid the above-described delays and, upon a determination that the subset is in the cache, intercepts, or otherwise disables, the request for the select instances of the subsets from the process nodes.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged process facility.

Figure 1:
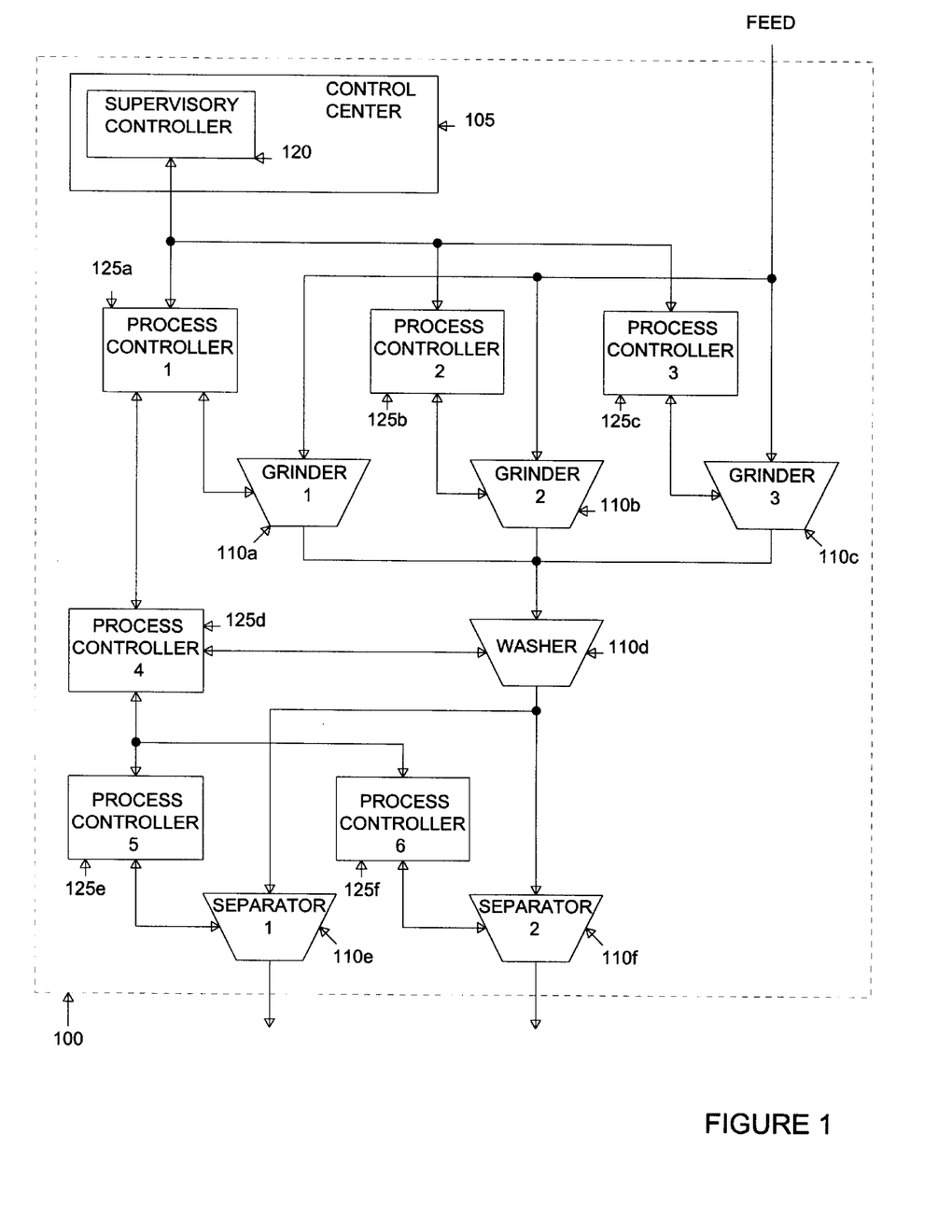
FIG. 1 illustrates a block diagram of a process facility with which a control system according to the principles of the present invention may be used.

FIG. 1 illustrates a block diagram of a process facility 100 in which a control system according to the principles of the present invention may be implemented. Exemplary process facility 100 processes raw materials, and includes a control center 105 and six associated processes, items 110a–110f, arranged in three stages. The term "include," as used herein, means inclusion without limitation. Exemplary control center 105 may comprise a central area that is commonly manned by an operator (not shown) for monitoring and controlling the three exemplary process stages. A first process stage includes three raw material grinders 110a–110c that receive a "feed" of raw material and grind the same, such as by using a pulverizer or a grinding wheel, into smaller particles of raw material. The second process stage includes a washer 110d that receives the ground raw materials and cleans the same to remove residue from the first stage. The third process stage includes a pair of separators 110e and 110f that receive the ground, washed raw materials and separate the same into desired minerals and any remaining raw materials. Since this process facility is provided for purposes of illustration only and the principles of such a facility are well known, further discussion of the same is beyond the scope of this patent document and unnecessary.

The exemplary control system includes a supervisory controller 120 and six process nodes, or process controllers 125a–125f, each of which is implemented in software and executable by a suitable conventional computing system (standalone or network), such as any of Honeywell, Inc.'s AM K2LCN, AM K4LCN, AM HMPU, AxM or like systems. Those skilled in the art will understand that such controllers may be implemented in hardware, software, or firmware, or some suitable combination of the same. In general, the use of computing systems in control systems for process facilities is well known.

Supervisory controller 120 is associated with each of process controllers 125, directly or indirectly, to allow the exchange of information. The phrase "associated with" and derivatives thereof, as used herein, may mean to include within, interconnect with, contain, be contained within, connect to or with, couple to or with, be communicable with, cooperate with, interleave, be a property of, be bound to or with, have, have a property of, or the like. Supervisory controller 120 monitors characteristics (e.g., status, temperature, pressure, flow rate, current, voltage, power, utilization, efficiency, cost and other economic factors, etc.) of associated processes 110, either directly or indirectly through process controllers 125 associated with processes 110. Depending upon the specific implementation, such monitoring may be of an individual process, a group of processes, or the whole facility.

Supervisory controller 120 communicates with associated processes 110 via process controllers 125 and generates supervisory data in order to optimize process facility 100. The phrase "supervisory data," as used herein, is defined as any numeric, qualitative or other value generated by supervisory controller 120 to control (e.g., direct, manage, modify, recommend to, regulate, suggest to, supervise, cooperate, etc.), for example, a particular process, a group of processes, the whole facility, a process stage, a group of stages, a sequence of processes or stages, or the like, to optimize the facility as a whole. In a preferred embodiment, the supervisory data is dynamically generated and is based at least upon a given facility's efficiency, production or economic cost, and most preferably all three.

Process controllers 125 monitor associated processes 110 and operate to varying degrees in accordance with the supervisory data to control the associated processes, and, more particularly, to modify one or more processes and improve the monitored characteristics and the facility as a whole. The relationship between supervisory controller 120 and various ones of process controllers 125 may be master-slave (full compliance), cooperative (varying compliance, such as by using the supervisory data as a factor in controlling the associated processes), or complete disregard (noncompliance). Depending upon the specific implementation and the needs of a given facility, the relationship between supervisory controller 120 and a specific process controller 125 may be static (i.e., always only one of compliance, cooperative, or noncompliance), dynamic (i.e., varying over time, such as within a range between compliance and noncompliance, or some lesser range in between), or switching between static periods and dynamic periods.

FIG. 1 depicts the process controllers 125a–f as simple logical blocks coupled to the processes 110a–f for purposes of illustration only. In reality, the process controllers 125a–f may be implements in process facility 100 as any of a wide range of devices. In the simplest embodiments, an exemplary process controller 125 may be micro-controller circuit fabricated on a circuit board and integrated into one of the processes 110 (i.e, part of a separator, washer, or grinder) that is being controlled. In other embodiments, an exemplary process controller 125 may be a stand-alone computer, such as a personal computer (PC), that is remote from the controlled process 110 and coupled to it by a bus architecture.

In more complex embodiments, an exemplary process controller 125 may be a network node coupled to one or more processes) 110 by a network architecture. The supervisory controller 120 may then treat the network containing the exemplary process controller 125 and its associated processes 110 as a single functional group. Finally, an exemplary process controller 125 may be a group of process controllers and their associated processes 110 that are networked together. The networked group may then be treated as a single functional group by supervisory controller 120.

The process controllers 125a–f produce process data that is used by the supervisory controller 120 for a variety of purposes, including generating the supervisory data and distributing the process data to one or more client applications. Process data may also be used by the process controller 125 that produced it to control the associated process 110. For example, a process controller 125 may read physical parameter data from a process 110, such as temperature, pressure, flow rate, and the like, and use some or all of that process data and, perhaps, some supervisory data to control the process 110. This is particularly true in a feedback-controlled process.

Process data may be transferred directly between process controllers 125a–f in a peer-to-peer relationship, as in a LAN network. For example, process controller 4, which controls the washer (item 110d), may request process data from process controllers 1–3, which control grinders 1–3, in order to determine the rate at which ground raw material is being output from grinders 1–3. The washer may thereby adjust the rate at which it washes the ground material. For example, the washer may reduce the amount of power that it uses to wash the ground raw material when the amount of ground raw material being sent to the washer is relatively low. It may even temporarily shut down in order to "hold and wait" for a suitable amount of ground raw material to accumulate before it resumes washing.

In some embodiments of the present invention, the supervisory controller 120 may comprise a LAN, a group of connected LANs, or a WAN architecture. One or more client applications are executed on nodes of the LAN/WAN architecture. The nodes may be, for example, personal computers (PCs) . The client applications may all require the same process data and supervisory to be transferred at the same update rate from the process controllers. However, a more likely scenario is that the client applications require different, possibly over-lapping, subsets of the process data and supervisory data and require the process data and supervisory data to be transferred at different update rates to different client applications.

To minimize overall data traffic and to avoid bottlenecks at heavily requested process controllers 125, a preferred embodiment of the present invention implements a novel scheme for distributing a large quantity of cyclic data in a deterministic manner from a plurality of nodes that contain the data to a plurality of nodes that require the data. This is accomplished by a publication/subscription distribution scheme that allows data to be transferred to a node that needs the data (i.e., a subscriber controller) from a node that contains the data (i.e., a publisher controller) without requiring the subscriber controller to repeatedly (cyclically) request the data. The publication and subscription scheme for distributing data is described in greater detail in the co-pending U.S. patent application Ser. No. (Attorney Docket No. HWEL01-00169), entitled "Systems and Methods for Accessing Data Using Cyclic Publish/Subscribe Scheme with Report By Exception," which application was previously incorporated by reference into the present disclosure as if fully set forth herein.

Generally, the supervisory controller 120 joins the process controllers 125a–f by polling (scanning) at a fixed or flexible interval for all process data that is mapped by user configuration to the database associated with the supervisory controller 120. As stated above, a problem is encountered, however, when the quantity of information in the process controller 125a–f network(s) is greater than that which can be polled all together at an acceptable update rate. In such a case, it may take two or more pollings of one or more of the process controllers 125a–f to retrieve all of the process data required by the client applications. This is particularly true for those client applications in which users may switch back and forth between screens (views) displaying a relatively large amount of process data from a process control network, which process data may be changing value frequently.

To overcome this problem, the present invention implements a fast dynamic cache associated with the supervisory controller 120 that transfers (updates) process data to the client applications at a faster rate than the rate at which the process controllers 125a–f can transfer the process data. In the present invention, the term "dynamic," when used to refer to the cache, refers to the ability of the cache to hold process data and/or supervisory data of current or recent interest to the client applications communicating with the domain of the supervisory controller 120. The dynamic cache provides a more flexible mapping between the domain of the supervisory control 120 and the domain of the process controllers 125a–f.

In one embodiment of the present invention, one or more server nodes may physically join the supervisory controller 120 to the process controllers 125a–f. These server nodes are the data repositories for all client access among the supervisory controller's client nodes. The supervisory controller 120 maps the essential process data of the process controllers 125a–f into a homogeneous database controlled by the supervisory controller 125 for consistent storage and access by individual process controllers 125a–f or by any client application being executed by the supervisory controller 120.

Figure 2:
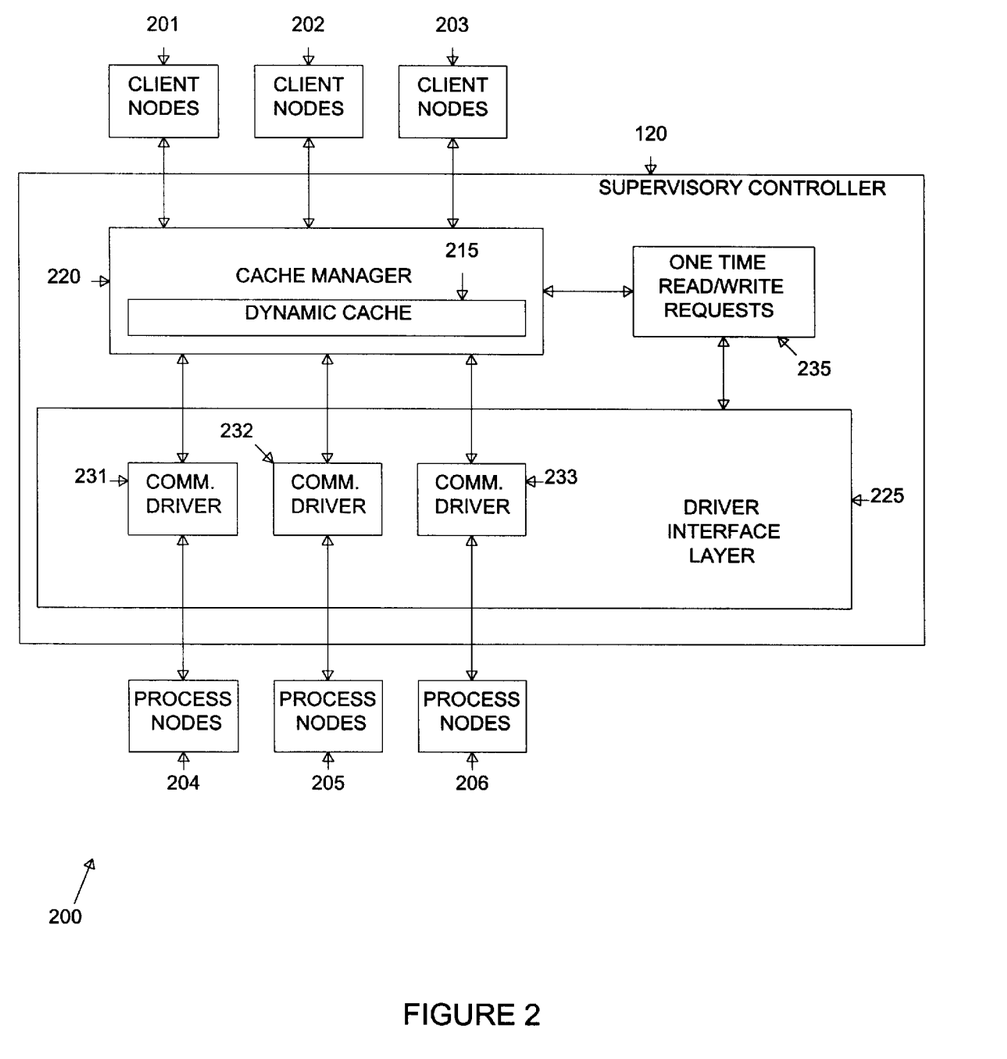
FIG. 2 illustrates a process control system which includes a supervisory controller that contains a dynamic cache in accordance with one embodiment of the present invention.

FIG. 2 illustrates a process control system 200 which includes a supervisory controller 120 that contains a dynamic cache 215 in accordance with one embodiment of the present invention. The process control system 300 also comprises a plurality of client nodes 201–203 coupled to the supervisory controller 120. One or more client applications are resident on each of client nodes 201–203 and are executed by the client node in conjunction with the supervisory controller 120.

For the purpose of simplifying the following description of FIG. 2, a process controller 125 and its associated process(es) 110 are referred to collectively as a "process node." The supervisory controller 120 is coupled to a plurality of process nodes 204–206. The supervisory controller 120 contains a driver interface layer 225 comprising a plurality of communication drivers 231–233. The communication drivers 231–233 are compatible with corresponding ones of process nodes 204–206 and are used to periodically or aperiodically retrieve process data from process nodes 204–206 in order to update the dynamic cache 215. The communication drivers also handle one-time read/write requests from the supervisory controller 120 to/from the process nodes 204–206.

The supervisory controller 120 handles data read/write requests from the client nodes 201–203 according to common protocols, such as application programming interfaces (APIs). The data access requests of the client nodes 201–203 are primarily retrieved from/written to the dynamic cache 220, with occasional one-time service requests to access infrequently-used process data in the process nodes 204–206.

When a client application requires process data, a data request is sent to supervisory controller 120 and is received in cache manager 220. In one embodiment of the present invention, cache manager 220 first searches dynamic cache 220 for the requested process data. If the process data is found (a cache hit), cache manager 220 transfers the process data to the requesting client application and the transaction is ended. If the data is not found (a cache miss), cache manager 220 then requests the process data from the appropriate one of process nodes 204–206. When the supervisory controller 120 receives the process data from the process node, cache manager 215 writes the process data into dynamic cache 215 and transfers the process data to the client application that originally requested it.

In alternate embodiments of the present invention, when the cache manager 220 receives a request for process data from a client application, the cache manager substantially simultaneously searches for the process data in the dynamic cache 215 and issues a request for the process data to the appropriate process node which holds the process data. If a cache hit occurs, the data request to the process node is canceled. If a cache miss occurs, the cache manager 220 waits for the process data to be returned by the process node in response to the already sent data request. Again, when the process data is received from the process node after a cache miss, the process data is both written to the dynamic cache 215 and transferred to the client application that originally requested it.

Process data is removed from the dynamic cache 215 on a time-of-last-access basis, so that the oldest process data is purged to make room for new process data. Whenever the supervisory controller 120 retrieves process data that is currently being cached, the cache entry is time stamped to indicate the time of access. This is performed as a background activity by the cache manager 220 so that the foreground activities of updating with new process data and servicing client node data requests is not interrupted.

In a preferred embodiment of the present invention, the supervisory controller 120 may comprise a plurality of server nodes that provide at least a primary dynamic cache and a secondary dynamic cache. The secondary dynamic cache reflects the contents of the primary dynamic cache, but does not actively access process data in response to data requests from client nodes 201–203 unless the primary cache fails and the secondary cache becomes the primary, thereby avoiding a doubling of network traffic.

In order to maximize the capacity of the dynamic cache 215, only one copy of each process datum is kept in the dynamic cache 215. Thus, if multiple client applications require the same process datum, all requests for that datum are held in the same entry location in the dynamic cache 215. Client applications that require infrequently-accessed data may use an API to indicate that the process data request is a non-cyclic or infrequent request. The supervisory controller 120 transfers the infrequently-accessed process datum directly to the requesting client application, but, because of the relative infrequency of the process data request, does not add a new entry after a cache miss occurs.

When data is written to a process node, the process data is transferred directly to the specified process node, but the cache manager 220 does not update the dynamic cache 215 based on this write operation. Instead, the dynamic cache 215 is updated by reading the newly written process data back from the process node, thereby ensuring that the value in the dynamic cache 215 is always the same as the value in the process node.

Figure 3:
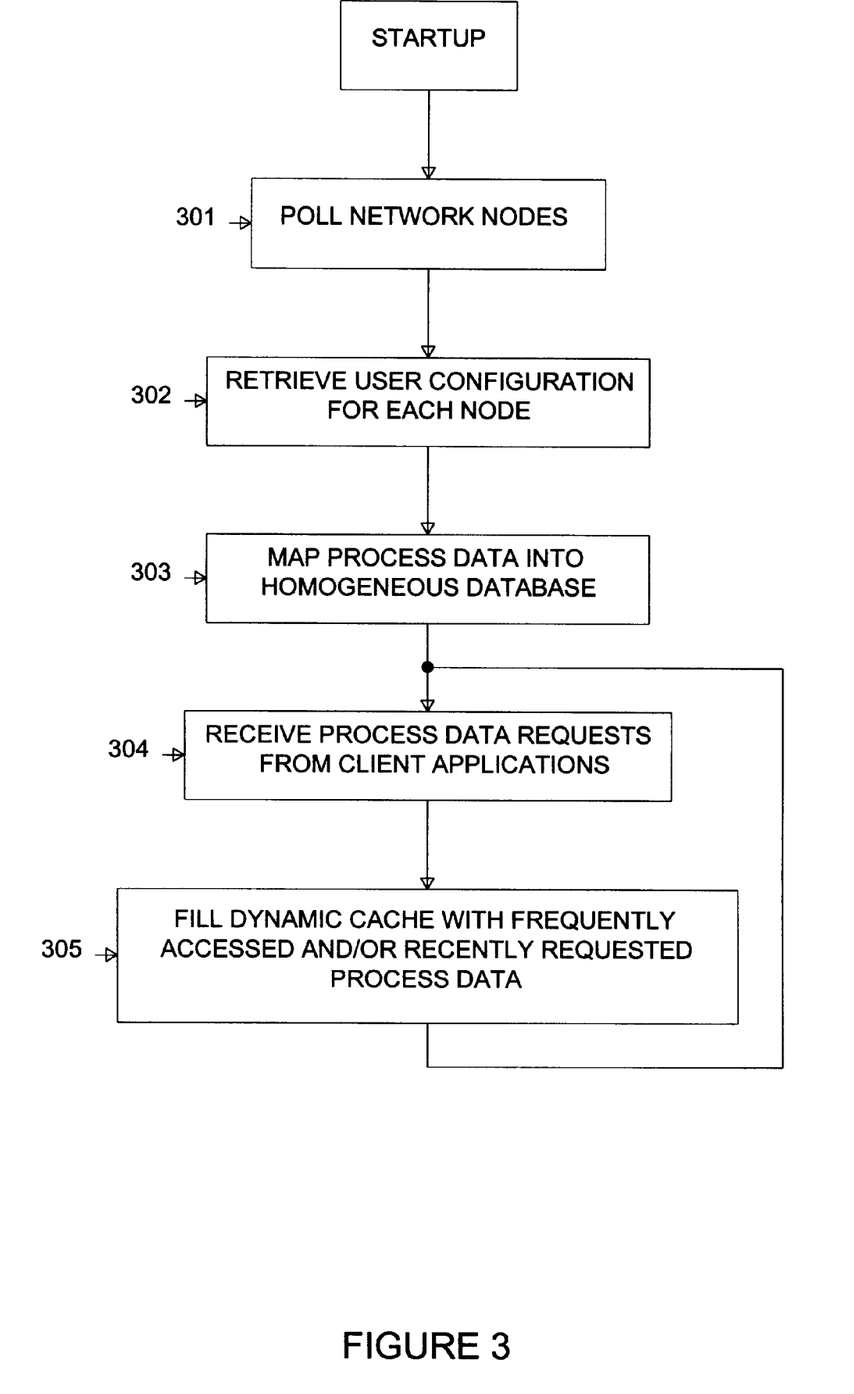
FIG. 3 is a flow diagram illustrating the initial configuration and subsequent routine operation of the supervisory controller.

FIG. 3 is a flow diagram illustrating the initial configuration and subsequent routine operation of the supervisory controller 120. The supervisory controller 120 polls the process nodes 204–206 and the client nodes 201–203 upon joining the network (Step 301) and retrieve user configuration data for each node (Step 302). Based on the user configuration data and the subscription lists of the client nodes 201–203 and the process nodes 204–206, the supervisory controller 120 maps the requested process data into an homogeneous database associated with the supervisory controller 120 (Step 303), allocating one entry per datum, thereby eliminating redundant copies of the same datum required by more than one client node and/or process node. Thereafter, during routine operation, the supervisory controller 120 repeatedly receives process data requests from client applications (Step 304) and fills the dynamic cache 215 with at least a portion of the process data retrieved from the process nodes 204–206, depending on the frequency at which a particularly process datum is requested and/or how recently a process datum was requested (Step 305).

Figure 4A:
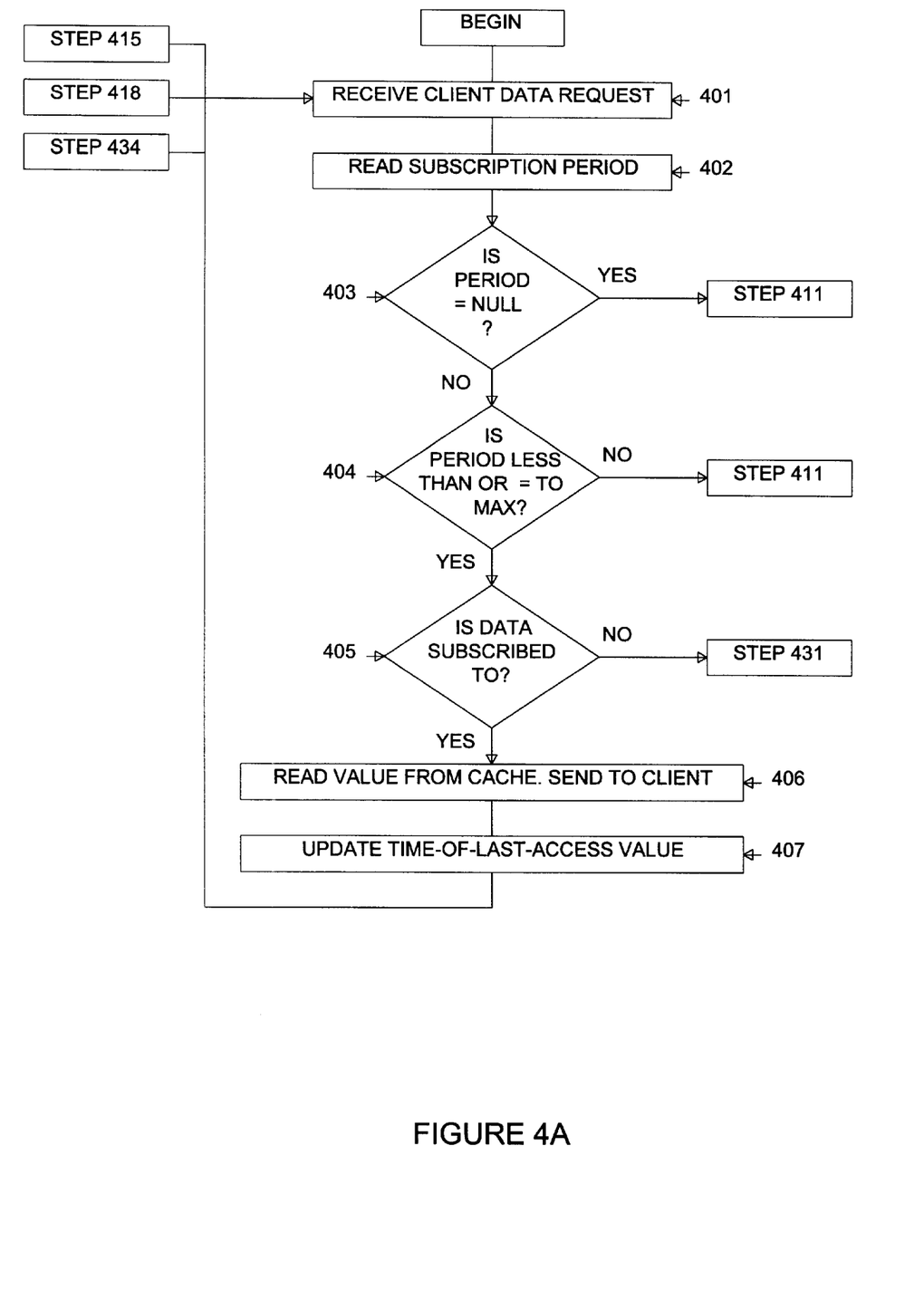
FIGS. 4A–4C are a flow diagram illustrating in greater detail the operation of the cache manager and the dynamic cache.
Figure 4B:
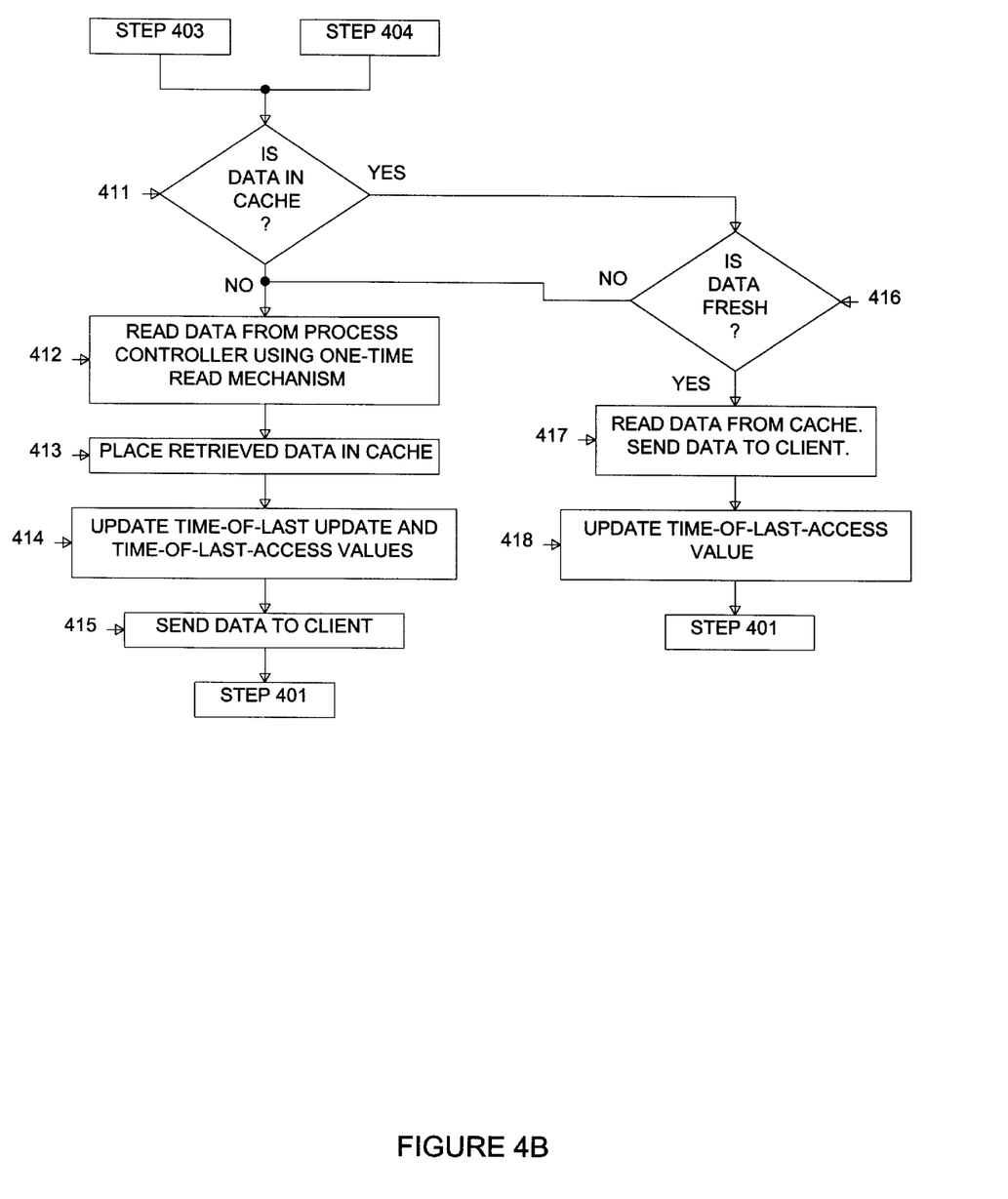
Figure 4C:
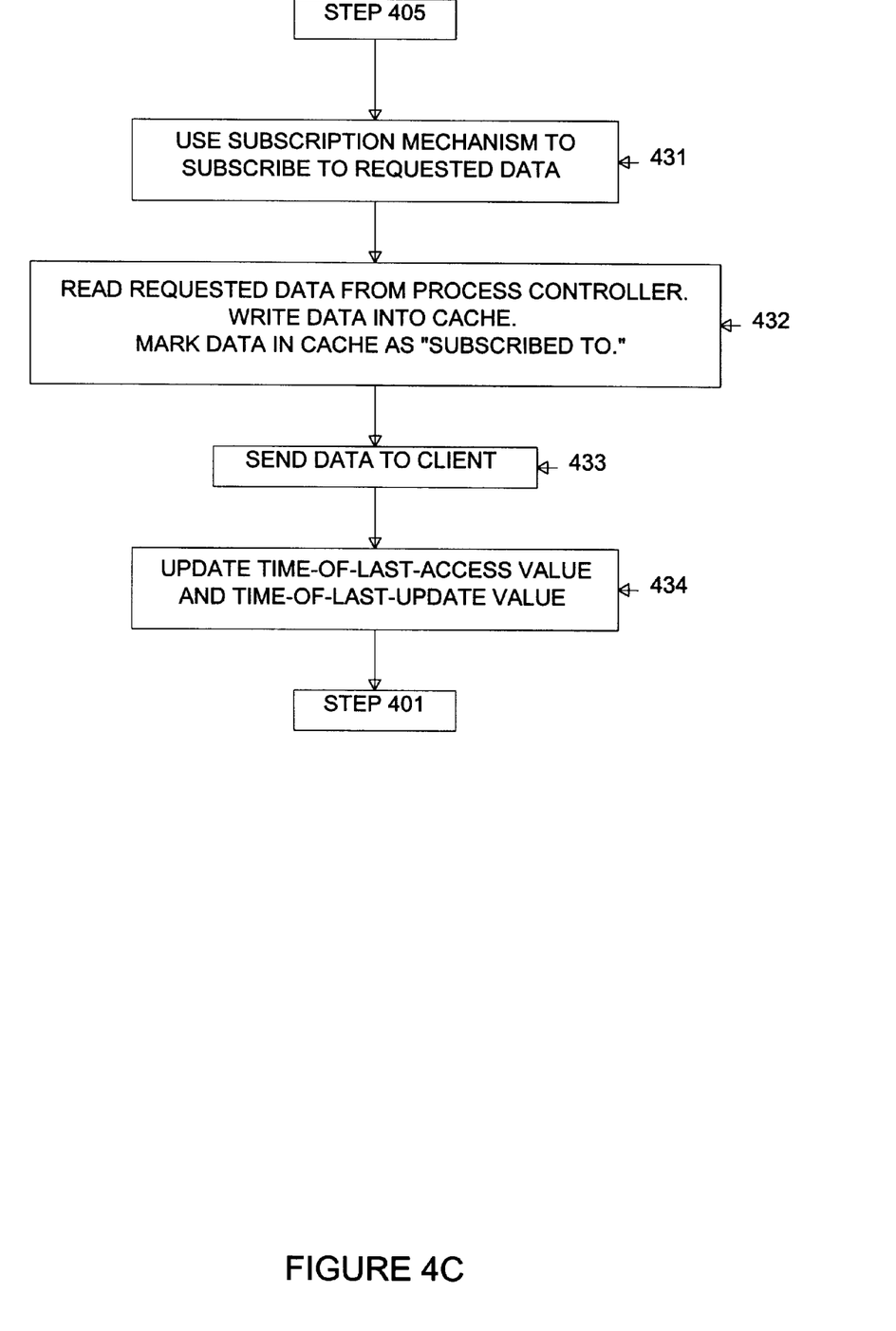

FIGS. 4A–4C are a flow diagram illustrating in greater detail the operation of the cache manager 220 and the dynamic cache 215. The strategy for determining whether or not requested process data is stored in dynamic cache 215 is dependent on a "SUBSCRIPTION PERIOD" variable provided by a client node requesting data and two "data freshness" indicators, "TIME-OF-LAST-UPDATE" and "TIME-OF-LAST-ACCESS," maintained by the cache manager 220 and dynamic cache 215. The TIME-OF-LAST-UPDATE value is a time stamp stored in dynamic cache 215 that is associated with a process datum, called DATUM X, indicating the last time that DATUM X was retrieved from the process controller 125 that contains DATUM X. The TIME-OF-LAST-ACCESS value is a time stamp stored in dynamic cache 215 that is associated with DATUM X and indicates the last time that DATUM X was accessed in the dynamic cache 215 by any one of the client nodes 202–204.

At the start of a cache operation, the cache manager 220 receives a client data request (Step 401) and reads the SUBSCRIPTION PERIOD value specified by the requesting client node (Step 402). If the SUBSCRIPTION PERIOD value is "null" (i.e., no value), the client node is making a "one time" request for the data, rather than a periodic request (or subscribing to the requested data). In that case, the cache manager 220 checks to see if the requested data is coincidentally in the dynamic cache 215 (Step 411).

If the requested data is not cached, the cache manager 220 and supervisory controller 120 read the requested data from the appropriate process controller 125 using a one-time read mechanism, rather than by subscribing to the requested data (Step 412). The retrieved data is then placed in the dynamic cache 215 (Step 413) and the TIME-OF-LAST-UPDATE and TIME-OF-LAST-ACCESS values are updated (Step 414) in the dynamic cache 215. The retrieved data is then sent to the requesting client node (Step 415) and the cache manager 220 begins the next data request cycle (return to Step 401).

If the requested data is in the dynamic cache 215, the cache manager 220 verifies that the data is still "fresh" by comparing the TIME-OF-LAST-UPDATE and/or TIME-OF-LAST-ACCESS values to a configurable system-wide cache freshness time. If the data is still fresh, the cache manager 220 reads the data from the dynamic cache 215, sends the data to the requesting client node (Step 417) and updates the TIME-OF-LAST-ACCESS value (Step 418). The cache manager 220 then begins the next data request cycle (return to Step 401).

If the data is not fresh, the cache manager 220 and the supervisory controller 120 retrieve the requested data from the appropriate process controller in a one-time read operation, place the retrieved data in the dynamic cache 215, update the TIME-OF-LAST-UPDATE and TIME-OF-LAST-ACCESS values, and send the data to the requesting client (Steps 412–415).

If the SUBSCRIPTION PERIOD value is not a null value, the client node is making a cyclic (or periodic) request for data. However, the requested data will only be subscribed to if the rate (i.e., frequency) at which the data is repeatedly requested is frequent enough to justify subscribing to the requested data. Cache manager 215 compares the SUBSCRIPTION PERIOD to a configurable system-wide maximum subscription period (Step 404).

If the SUBSCRIPTION PERIOD exceeds the maximum limit, the data request is treated instead as a one-time request. The cache manager 220 checks to see if the requested data is coincidentally in the dynamic cache 215 (Step 411). If the requested data is cached, a freshness check is performed and, if the data is also fresh, the data is retrieved from the dynamic cache 215, sent to the requesting client and the TIME-OF-LAST ACCESS value is updated (Steps 416–418). If the requested data is not cached or not fresh, the cache manager 220 and supervisory controller 120 read the requested data from the appropriate process controller 125 using a one-time read mechanism, rather than by subscribing to the requested data (Step 412). The retrieved data is then placed in the dynamic cache 215 (Step 413) and the TIME-OF-LAST-UPDATE and TIME-OF-LAST-ACCESS values are updated (Step 414) in the dynamic cache 215. The retrieved data is then sent to the requesting client node (Step 415) and the cache manager 220 begins the next data request cycle (return to Step 401).

If the SUBSCRIPTION PERIOD is within the specified maximum limit, the requested data will be cached in dynamic cache 215. The cache manager 220 determines if the requested data has previously been subscribed to (Step 405). This may be done by looking for the requested data in the dynamic cache 215 and determining if a "Subscribed To" field associated with the data (if found) has been set.

If the data was not previously subscribed to, the cache manager 220 and the supervisory controller 120 use the subscription mechanism to subscribe to the requested data in the appropriate process controller 125 (Step 431). The requested data is then read from the process controller 125, written into the dynamic cache 215, and the "Subscribed To" field is set (Step 432). The requested data is then transferred to the requesting client node (Step 433) and the TIME-OF-LAST-UPDATE and TIME-OF-LAST-ACCESS values are updated (Step 434) in the dynamic cache 215. The cache manager 220 then begins the next data request cycle (return to Step 401).

If the data was previously subscribed to, the cache manager 220 reads the requested data from the dynamic cache (Step 406) and the TIME-OF-LAST-ACCESS value is updated (Step 407) in the dynamic cache 215. The cache manager 220 then begins the next data request cycle (return to Step 401).

It frequently occurs that a first client node subscribes to a selected process data at a first subscription rate, for example, once per second, and a second client node subscribes to the same selected process data, or a subset thereof, at a second subscription rate, for example, once every two seconds. In this example, the terms "first" and "second" are used to distinguish client nodes and subscription rates and do not refer to chronological order of occurrence. In a preferred embodiment of the present invention, the cache manager 220 retrieves the subscribed process data from the process controller containing the data at the faster rate (in this example, once per second). The cache manager 220 maintains both subscription rates in the dynamic cache 215. If, at a later time, the first client node ceases subscribing to the selected process data, the cache manager 220 then reverts back to the slower subscription rate (in this example, once every two seconds) without any action or intervention being taken by the second client node.

If more than two client nodes subscribe to the same process data, the cache manager 220 retrieves the process data from the appropriate process controller at the fastest subscription rate specified by any of the subscribing client nodes. If, at a later time, the client node that subscribed at the fastest rate ceases subscribing to the selected process data, the cache manager 220 then reverts back to the next fastest subscription rate without any action or intervention being taken by any of the subscribing client nodes.

Although the present invention and its advantages have been described in detail, those skilled in the art should understand that they can make various changes, substitutions and alterations herein without departing from the spirit and scope of the invention in its broadest form.

What is claimed is:

1. A system for distributing data among nodes of a process facility, wherein ones of said nodes are client nodes desiring data associated with processes thereof and ones of said nodes are process nodes controlling said process data, said system comprising:
   a cache that has a relatively short time to retrieve records therefrom; and
   a supervisory controller, associated with said client nodes and said process nodes, that (i) controls storage of a portion of said process data in said records in said cache, allocating one record entry per datum of said portion of said process data, thereby eliminating redundant copies of any datum of ones of said client nodes and said process nodes, and (ii) selectively communicates ones of said records from said cache to said client nodes.

2. The system as set forth in claim 1 wherein said supervisory controller selectively communicates said ones of said records in response to requests from said client nodes.

3. The system as set forth in claim 2 wherein said client nodes request subsets of said process data and said supervisory controller determines whether said requested subsets are stored in said cache.

4. The system as set forth in claim 3 wherein said supervisory controller, in response to said determination, one of:
   requests instances of select ones of said requested subsets from said process nodes; and
   disables requests for select instances of said requested subsets from said process nodes.

5. The system as set forth in claim 1 wherein said supervisory controller receives subsets of said process data from said process nodes and stores at least a portion of said subsets in records of said cache.

6. The system as set forth in claim 1 wherein said supervisory controller receives subsets of said process data from said process nodes and selectively communicates at least a portion of said subsets to said client nodes.

7. The system as set forth in claim 1 wherein said supervisory controller, said client nodes and said process nodes are associated by communication paths having data traffic capacities and said system controls data distribution using said supervisory controller to efficiently utilize said data traffic capacities.

8. A method of operating a system that distributes data among nodes of a process facility, wherein ones of said nodes are client nodes desiring data associated with processes thereof and ones of said nodes are process nodes controlling said process data, said method of operation comprising the steps of:
   using a supervisory controller, associated said client nodes and said process nodes, to control storage of a portion of said process data in records of a cache that has a relatively short time to retrieve records therefrom, allocating one record entry per datum of said portion of said process data, thereby eliminating redundant copies of any datum of ones of said client nodes and said process nodes; and
   selectively communicating ones of said records from said cache to said client nodes.

9. The method as set forth in claim 8 wherein said selective communication step is responsive to the step of receiving requests from said client nodes.

10. The method as set forth in claim 9 wherein said client nodes request subsets of said process data and said method further comprises the step of determining whether said requested subsets are stored in said cache.

11. The method as set forth in claim 10, in response to said determination step, further comprises one of the steps of:
   requesting instances of select ones of said requested subsets from said process nodes; and
   disabling requests for select instances of said requested subsets from said process nodes.

12. The method as set forth in claim 8 further comprising the steps of:
   receiving, at said supervisory controller, subsets of said process data from said process nodes; and
   storing at least a portion of said subsets in records of said cache.

13. The method as set forth in claim 8 further comprising the steps of:
   receiving, at said supervisory controller, subsets of said process data from said process nodes; and
   selectively communicating at least a portion of said subsets to said client nodes.

14. The method as set forth in claim 8 wherein said supervisory controller, said client nodes and said process nodes are associated by communication paths having data traffic capacities and said method further comprises the step of utilizing said data traffic capacities to efficiently control data distribution among said nodes.

15. A supervisory controller, for use in a system that distributes data among nodes of a process facility wherein ones of said nodes are client nodes desiring data associated with processes thereof and ones of said nodes are process nodes controlling said process data, comprising:
   a memory controller that can be associated with a cache having a relatively short time to retrieve records therefrom and that controls storage of a portion of said process data in said records in said cache, allocating one record entry per datum of said portion of said process data, thereby eliminating redundant copies of any datum of ones of said client nodes and said process nodes; and a communications controller that can be associated with said client nodes and said process nodes and selectively communicates ones of said records from said cache to said client nodes.

16. The supervisory controller as set forth in claim 15 wherein said communications controller is responsive to requests from said client nodes.

17. The supervisory controller as set forth in claim 16 wherein said client nodes request subsets of said process data and said memory controller determines whether said requested subsets are stored in said cache.

18. The supervisory controller as set forth in claim 17 wherein said communications controller, in response to said determination, one of:

requests instances of select ones of said requested subsets from said process nodes; and disables requests for select instances of said requested subsets from said process nodes.

19. The supervisory controller as set forth in claim 15 wherein said communications controller receives subsets of said process data from said process nodes and memory controller stores at least a portion of said subsets in records of said cache.

20. The supervisory controller as set forth in claim 15 wherein said communications controller receives subsets of said process data from said process nodes and selectively communicates at least a portion of said subsets to said client nodes.

21. The supervisory controller as set forth in claim 15 wherein said supervisory controller, said client nodes and said process nodes are associated by communication paths having data traffic capacities and said supervisory controller controls data distribution by efficiently utilizing said data traffic capacities.

22. A real time process control system for use to control a process facility, comprising:

a plurality of sensors and controllable devices that are associated with processes of said process facility;

communication paths associating said plurality of sensors and controllable devices with a computer system; and said computer system operates on data relating to said process facility, and distributes said data among nodes of said computer system, wherein ones of said nodes are client nodes desiring data associated with processes thereof and ones of said nodes are process nodes controlling said process data, said computer system comprising:

a cache that has a relatively short time to retrieve records therefrom; and a supervisory controller, associated with said client nodes and said process nodes, that (i) controls storage of a portion of said process data in said records an said cache, allocating one record entry per datum of said portion of said process data, thereby eliminating redundant copies of any datum of ones of said client nodes and said process nodes, and selectively communicates ones of said records from said cache to said client nodes.

23. The real time process control system as set forth in claim 22 wherein said supervisory controller selectively communicates said ones of said records in response to requests from said client nodes.

24. The real time process control system as set forth in claim 23 wherein said client nodes request subsets of said process data and said supervisory controller determines whether said requested subsets are stored in said cache.

25. The real time process control system as set forth in claim 24 wherein said supervisory controller, in response to said determination, one of:

requests instances of select ones of said requested subsets from said process nodes; and disables requests for select instances of said requested subsets from said process nodes.

26. The real time process control system as set forth in claim 22 wherein said supervisory controller receives subsets of said process data from said process nodes and stores at least a portion of said subsets in records of said cache.

27. The real time process control system as set forth in claim 22 wherein said supervisory controller receives subsets of said process data from said process nodes and selectively communicates at least a portion of said subsets to said client nodes.

28. The real time process control system as set forth in claim 22 wherein said supervisory controller, said client nodes and said process nodes are associated by communication paths having data traffic capacities and said system controls data distribution using said supervisory controller to efficiently utilize said data traffic capacities.

* * * * *